UNITED STATES PATENT OFFICE.

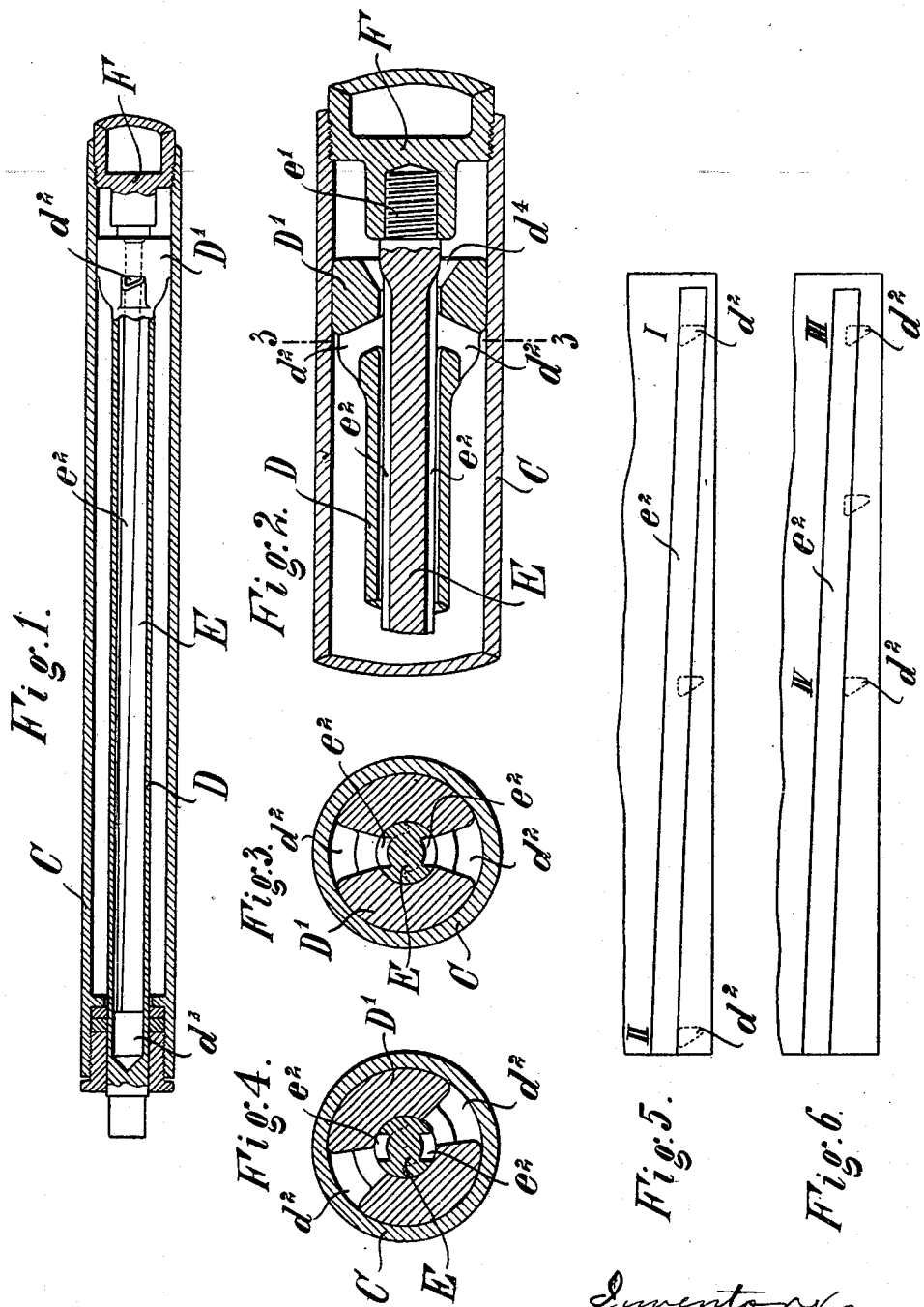

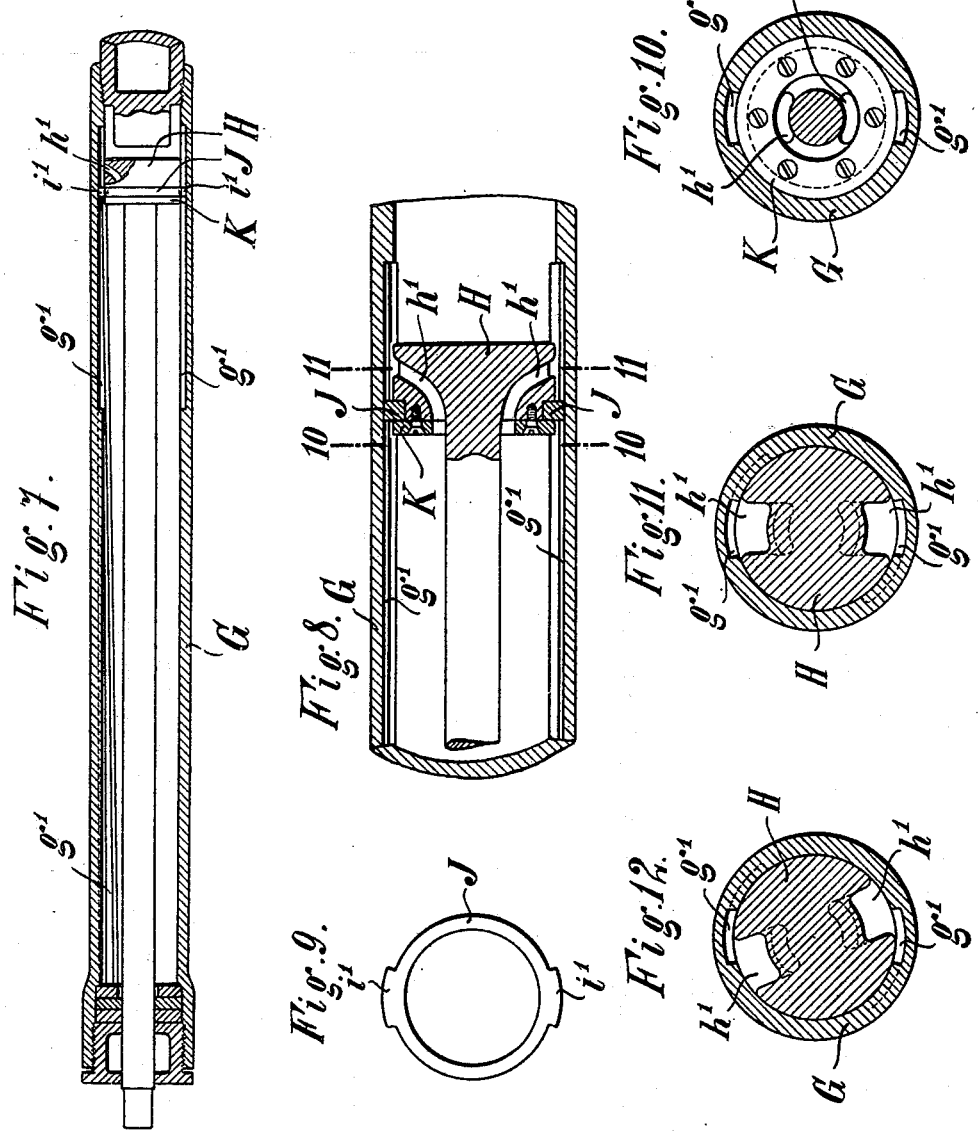

OTTO LAUBER AND NORBERT KOCH, OF ESSEN-ON-THE-RUHR, GERMANY, ASSIGNORS TO FRIED. KRUPP AKTIENGESELLSCHAFT, OF ESSEN-ON-THE-RUHR, GERMANY.

FLUID-BRAKE FOR RECOIL-GUNS.

No. 864,658. Specification of Letters Patent. Patented Aug. 27, 1907.

Application filed January 3, 1906. Serial No. 294,413.

*To all whom it may concern:*

Be it known that we, OTTO LAUBER, residing at Essen-on-the-Ruhr, (West,) Germany, and NORBERT KOCH, residing at Essen-on-the-Ruhr, Germany, both subjects of the Emperor of Germany, have invented a certain new and useful Improvement in Fluid-Brakes for Recoil-Guns, of which the following is a specification.

The present invention relates to fluid-brakes for recoil-guns provided with means for regulating the length of recoil, and the object of the invention is to provide a fluid-brake which is of simple and compact construction and by means of which a particularly fine graduation of the length of recoil may be obtained.

In the accompanying drawing, two embodiments of the invention are shown by way of example.

Figure 1 shows one embodiment of the brake, partly in side view and partly in longitudinal section; Fig. 2 is a longitudinal section of a part of the brake, on an enlarged scale; Fig. 3 is a sectional view on the line 3—3, Fig. 2; Fig. 4 is a view corresponding to that shown in Fig. 3 with changed position of one of the parts; Figs. 5 and 6 are two diagrammatic views relating to the embodiment shown in Figs. 1 to 4. Fig. 7 is a view corresponding to that shown in Fig. 1, showing a second embodiment of the invention; Fig. 8 is a longitudinal section of a part of the brake shown in Fig. 7 on an enlarged scale; Fig. 9 is a detail view of the embodiment shown in Fig. 7; Fig. 10 is a sectional view on line 10—10, Fig. 8, seen from the left; Fig. 11 is a sectional view on line 11—11, Fig. 8, seen from the right; and Fig. 12 is a view corresponding to that shown in Fig. 11 with changed position of one of the parts.

Reference will first be had to the embodiment shown in Figs. 1 to 6.

C is the brake cylinder. The piston rod D and the piston D′ are provided with a central bore $d^3$ (Fig. 1) which extends from the front face of the piston D′ and almost to the free end of the piston rod D. Into the bore $d^3$ projects a throttle-rod E which is of the same diameter as the bore and which is firmly secured to the head F of the brake cylinder through the medium of a threaded end $e′$ (Fig. 2).

In the surface of the throttle rod E, two curved grooves $e^2$ are provided which are located diametrically opposite one another and which extend from the proximity of the end $e′$ to the free end of the throttle rod. The grooves extend spirally with such a pitch that the turning movement from end to end or, in other words, the circumferential offset of one end from the other is equal to the width of the groove. The width of the grooves is such that the circumferential dimension of these parts of the throttle-rod, that are between the grooves, are wider than the grooves. Two apertures $d^2$ in the piston and an enlargement $d^4$ (Fig. 2) of the bore in the piston D′, establish communication between the grooves $e^2$ and the fluid spaces in front of and behind the piston D′. The shape of the apertures $d^2$ and the relative arrangement of the grooves $e^2$ and the apertures $d^2$ is shown in the drawing.

When the parts assume the position shown in Figs. 1 to 3 and position I in Fig. 5 and the recoil takes place, the fluid passes from the space around the piston rod through the apertures $d^2$ and the grooves $e^2$, and flows on the one hand through the enlargement $d^4$, to the space beyond the piston, and on the other hand to the hollow space $d^3$ of the piston rod. In consequence of the spiral course of the grooves $e^2$ the apertures $d^2$, during the recoil, will be gradually cut off by the exterior wall of the throttle-rod E, that is to say the area of the passage at the point where the fluid passes from the apertures $d^2$ into the grooves $e^2$ will be gradually diminished and the fluid is consequently throttled progressively. When finally the apertures $d^2$ are entirely covered by the outer wall of the throttle-rod (see position II, Fig. 5), the passage for the fluid is cut off and the recoiling parts come to a standstill, which, however, by reason of the dimensions of the grooves $e^2$ and the apertures $d^2$, does not take place until the piston has completed its full (normal) stroke.

If it is desired to obtain a recoil the length of which is about half the normal recoil, the piston-rod D is turned by hand or automatically until the apertures $d^2$ are approximately half way cut off by the outer wall of the throttle-rod E when the parts are in the position of rest (see Fig. 4 and position III, Fig. 6). When the recoil commences the available area for the passage of the fluid is in this instance correspondingly smaller and during the recoil, it is gradually contracted and finally entirely closed, when the apertures $d^2$ have reached a position relatively to the grooves $e^2$, indicated at IV, Fig. 6, whereupon the moving parts come to a standstill.

It is evident that the normal length of recoil and that corresponding to the position of the piston relatively to the grooves $e^2$, which is shown in Fig. 4, are not the only lengths of recoil obtainable; on the contrary by suitable adjustment of the piston-rod any other lengths of recoils between the normal and the shortest permissible may be obtained. The device therefore, makes it possible to obtain a very fine graduation of the length of recoil.

The apertures which serve as communication between the space around the piston-rod and the grooves $e^2$ might of course be arranged in the piston rod instead of in the piston, without departing from the scope of the invention.

In the embodiment shown in Figs. 7 to 12, the throttle-rod and the bore in the piston and in the piston-rod are done away with. In the wall of the brake cylinder G are cut two curved grooves $g′$ which correspond to the grooves $e^2$ of the embodiment shown in Figs. 1 to 6.

The piston H is provided with two apertures $h'$ which extend from the piston rod side of the brake-cylinder to the cylindrical surface of the piston. The shape of the apertures and their arrangement relatively to the grooves $g'$ is shown in the drawing. The passage of the fluid from one side of the piston to the other side is confined to the apertures $h'$ through the medium of a rotatable ring J which is arranged in an annular groove in the piston and which is provided with two lugs $i'$ that engage with the grooves $g'$ without play therein. A ring K, which is firmly secured to the piston, prevents axial movement of the ring J.

When the recoil takes place, the fluid passes from the space around the piston-rod to the other side of the piston, through the apertures $h'$ and the grooves $g'$. From the explanation given in connection with the device shown in Figs. 1 to 4, it will be readily understood in what manner the braking of the recoil is effected in the second embodiment and how the regulation of the length of the recoil is accomplished by changing the relative angular position of the piston and the brake-cylinder. By causing the apertures $h'$ and the grooves $g'$ to assume the relative positions shown in Fig. 12, when the parts are in the position of rest, a recoil may be obtained the length of which is about half of the normal recoil.

The brakes according to the present invention must of course be attached to the gun in such a manner, that during the recoil the piston cannot turn relatively to the part that coöperates therewith (the throttle-rod or the brake-cylinder).

Having described the invention, what we claim as new therein and desire to secure by Letters Patent is:

1. A fluid brake provided with two parts relatively reciprocating during recoil, one part being provided with a spiral groove, through which fluid passes during recoil, and said parts being provided with a relative rotary adjustment whereby the flow of fluid through the groove is varied.

2. In a recoil brake having a piston past which the fluid escapes during recoil, a passage for the liquid comprising an opening in one of two relatively reciprocating parts, and a coinciding groove in the other of said parts; said groove being inclined to the longitudinal direction of reciprocation so that the flow is gradually throttled by the opening and groove moving out of coincidence.

3. In a recoil brake having a piston past which the fluid escapes during recoil, a passage for the liquid comprising an opening in one of two relatively reciprocating parts, and a coinciding groove in the other of said parts; said groove being inclined to the longitudinal direction of reciprocation so that the flow is gradually throttled by the opening and groove moving out of coincidence; said relatively reciprocating parts being relatively adjustable angularly to determine the length of recoil.

4. In a fluid brake for recoil guns, in which the fluid passes from one side of the piston to the other through suitable passages, relatively reciprocating parts between which said passages are formed, and a pair of longitudinal curved grooves forming parts of said passages; the offset between the ends due to the curvature of said grooves being equal approximately to the width of the grooves.

5. In a fluid-brake for recoil guns, a throttle-rod provided with a spiral groove.

6. In a fluid-brake for recoil-guns, the combination with the piston provided with apertures, of a throttle-rod between which and the piston there is relative reciprocation during recoil, and which is provided with spirally curved grooves forming with said apertures, the passages for the brake-fluid.

7. A fluid recoil brake having two relatively reciprocating parts, one of which is provided with a longitudinal groove, and the other of which controls the flow through said groove, the said parts being provided with a relative rotary adjustment to vary the flow through said groove to change the length of the recoil.

8. A fluid recoil brake comprising two relatively reciprocating parts, one of which is provided with a longitudinal groove and the other of which controls the flow through the groove in such a manner that when the parts are relatively rotated, the flow through the groove is varied to change the length of the recoil.

9. A fluid recoil brake provided with two relatively reciprocating parts, one having a spiral groove through which the fluid passes during recoil, and said parts being relatively adjustable to vary the flow.

The foregoing specification signed at Düsseldorf, this twelfth day of December, 1905.

OTTO LAUBER.
NORBERT KOCH.

In presence of—
PETER LIEBER,
WILLIAM ESSENWEIN.